Jan. 21, 1969  E. R. MILLS  3,423,567
ELECTRICALLY HEATED BEDCOVERING
Filed Dec. 8, 1966  Sheet 1 of 2
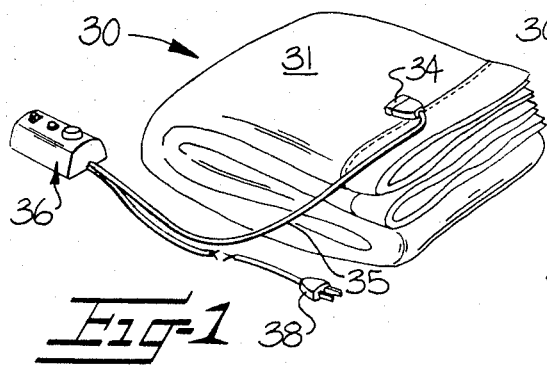
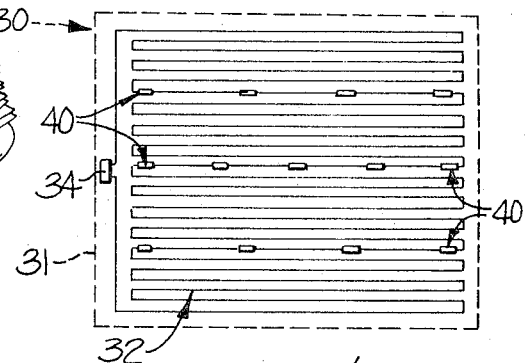
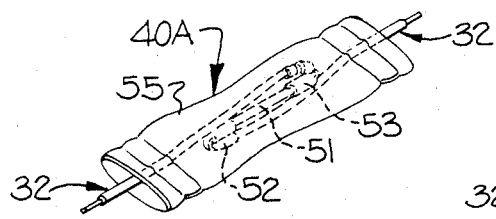
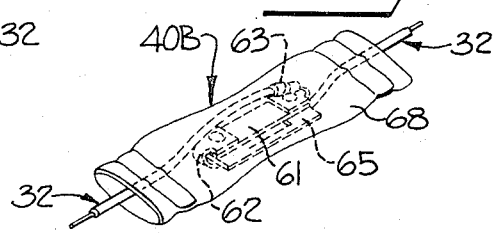
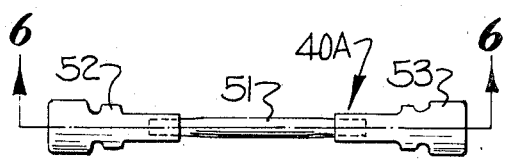
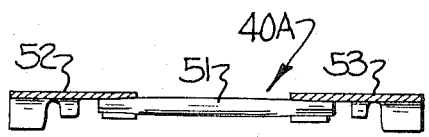
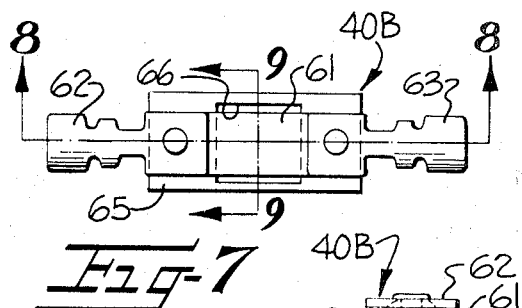
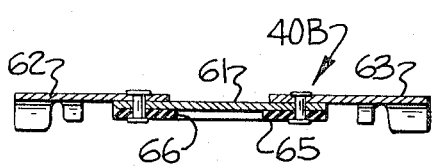
INVENTOR:
EDWIN R. MILLS
BY Parrott, Bell, Seltzer, Park & Heard
ATTORNEYS

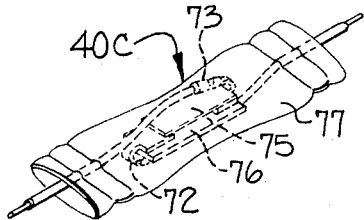
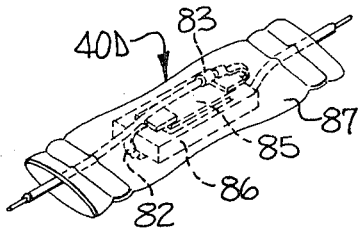
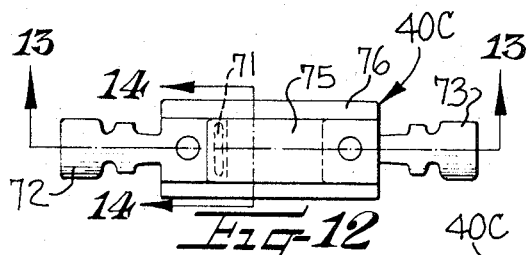
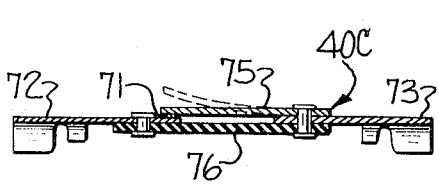
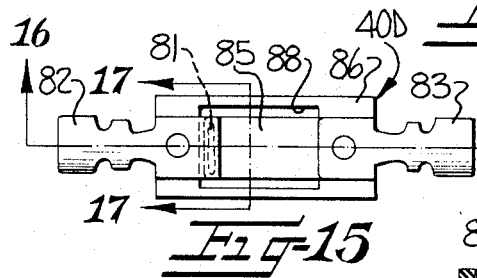
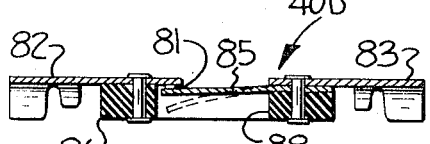
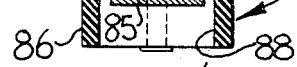
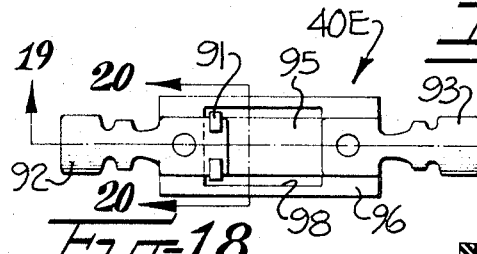
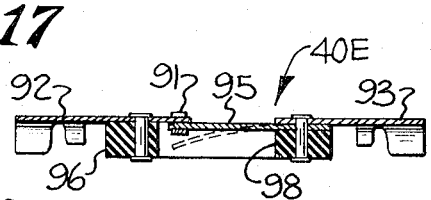
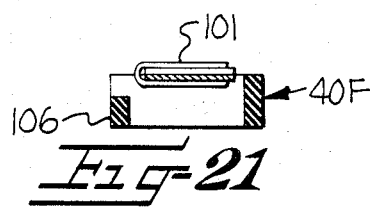

UNITED STATES PATENT OFFICE

United States Patent Office 3,423,567
Patented Jan. 21, 1969

3,423,567
ELECTRICALLY HEATED BEDCOVERING
Edwin R. Mills, Raleigh, N.C., assignor to Fieldcrest Mills, Inc., Spray, N.C., a corporation of Delaware
Filed Dec. 8, 1966, Ser. No. 600,181
U.S. Cl. 219—212
Int. Cl. H05b 1/00; 3/36
9 Claims

ABSTRACT OF THE DISCLOSURE

A plurality of devices which become electrically nonconductive within a predetermined range of temperatures typical of a localized overheated condition are positioned within and disposed throughout a bedcovering base, such as a blanket shell, and thermally coupled to an electrical heating means so as to be responsive to the temperature thereof. Each of the devices normally conducts electrical current and is electrically connected in series with the heating means. Upon the occurrence of a localized overheated condition and in response to an improperly high temperature of at least part of the heating means, an element within an affected one of the devices loses physical integrity and the corresponding device thereupon becomes electrically nonconductive so as to interrupt and preclude further flow of current in the heating means. The element which loses physical integrity preferably is an eutetic metal alloy, and the devices do not return to an electrically conductive condition subsequent to melting of one of the elements.

---

This invention relates to an electrically heated bedcovering, such as a blanket, protected against the continuance of a localized overheated condition and, more particularly, to such a blanket wherein the placement and number of a plurality of devices included in an overheat protection means is such that a more effectively protected blanket is obtained while a saving in manufacturing costs is realized.

It is recognized that an electrically heated bedcovering, such as a blanket, is subject to the occurrence of localized overheated conditions, which typically result from folding the electric blanket, placing thick insulating layers of other bedcoverings or the like over the electric blanket, or otherwise confining the heat generated in the electrical heating means of the bedcovering. When the heat generated in a heating means is thus confined, and is left uncontrolled, temperatures can be generated in a bedcovering base, such as a blanket shell, which are sufficiently high to present dangers of burning a user of the blanket or starting a fire. For this reason, the inclusion of some overheat protection means is necessary.

The most widely used overheat protective means have been those using thermostats or temperature responsive electrical switches which rely upon the physical movement of a bimetallic element, resulting from differential expansion, to open and close a pair of electrical contacts. While such bimetallic thermostats have been quite widely accepted and are virtually universally relied on in conventional overheat protection means for electrically heated blankets, several difficulties are attendant to their use.

First, a bimetallic thermostatic switch is relatively expensive to manufacture, due both to the materials which necessarily must be used and to the care with which the switch must be assembled and calibrated. For this reason, manufacturers of electrically heated bedcoverings prefer to use the least possible number of thermostatic switches. Additionally, while such switches will open upon the occurrence of a localized overheated condition, so as to preclude continued heating of the electrical resistance heater means in an electrical blanket, and will close once the localized overheated condition has been alleviated and permit resumption of use of the blanket, it is widely known that such cycling of bimetallic thermostatic switches results in the loss of calibration of the switches and accordingly leads to highly unsatisfactory operation of the electric blanket.

With the foregoing difficulties and deficiencies in mind, it is an object of the present invention to provide an electrically heated bedcovering in which an overheat protection means includes a relatively large number of economically produced and positively acting temperature responsive devices, so disposed throughout the blanket that at least one of the devices would be included in any fold which would so restrict the loss of heat from the electrical heating means as to bring about the occurrence of a localized overheated condition. In realizing this object of this invention, the devices included in the overheat protection means are thermally coupled to the electrical resistance heater means in the shell of the blanket, and each include an element which loses physical integrity within a predetermined range of temperatures typical of a localized overheated condition. Upon such loss of integrity by a particular element affected by the relatively high temperature typical of an overheated condition, the corresponding device becomes electrically nonconductive, and precludes further flow of current to the resistance heater means.

Some of the objects and advantages of the invention having been stated, others will appear as the description proceeds, when taken in connection with the accompanying drawings, in which:

FIGURE 1 is a perspective view of an electrically heated bedcovering in accordance with this invention;

FIGURE 2 is a schematic illustration of a portion of the bedcovering in FIGURE 1, showing the inclusion therein of an electrical resistance heating means and an overheat protection means;

FIGURE 3 is an enlarged perspective view, partially broken away, of one form of device in accordance with this invention as included in the overheat protection means of the blanket of FIGURE 1;

FIGURE 4 is a view similar to FIGURE 3 of another form of device in accordance with this invention;

FIGURE 5 is an elevation view of a portion of the device of FIGURE 3;

FIGURE 6 is a sectional view through the portion of a device shown in FIGURE 5, taken substantially along the line 6—6 in that figure;

FIGURE 7 is a view similar to FIGURE 5 of a portion of the device of FIGURE 4;

FIGURE 8 is a view similar to FIGURE 6 of the portion of a device shown in FIGURE 7, taken substantially along the line 8—8 in that figure;

FIGURE 9 is another sectional view of the portion of a device shown in FIGURE 7, taken substantially along the line 9—9 in that figure;

FIGURE 10 is a view similar to FIGURE 3 of another form of device in accordance with this invention;

FIGURE 11 is a view similar to FIGURE 3 of another form of device in accordance with this invention;

FIGURE 12 is a view similar to FIGURE 5 of a portion of a device shown in FIGURE 10;

FIGURE 13 is a view similar to FIGURE 6 of the portion of a device shown in FIGURE 10, taken substantially along the line 13—13 in that figure;

FIGURE 14 is a view similar to FIGURE 9 of the portion of a device shown in FIGURE 10, taken substantially along the line 14—14 in that figure;

FIGURE 15 is a view similar to FIGURE 5 of a portion of the device of FIGURE 11;

FIGURE 16 is a view similar to FIGURE 6 of the portion of a device of FIGURE 15, taken substantially along the line 16—16 in that figure;

FIGURE 17 is a view similar to FIGURE 9 of the portion of a device of FIGURE 15, taken substantially along the line 17—17 in that figure;

FIGURE 18 is a view similar to FIGURE 15 of a portion of another form of device in accordance with this invention, similar to the device of FIGURE 11;

FIGURE 19 is a view similar to FIGURE 16 of the portion of a device of FIGURE 18, taken substantially along the line 19—19 in that figure;

FIGURE 20 is a view similar to FIGURE 17 of the portion of a device of FIGURE 18, taken substantially along the line 20—20 in that figure; and FIGURE 21 is a view similar to FIGURE 20 of another form of device in accordance with this invention, similar to the device of FIGURE 18.

Referring now more particularly to the drawings, an electrically heated bedcovering, such as a blanket generally indicated at 30, is there shown (FIGURE 1) and the particular construction and arrangement of this invention will be discussed with reference thereto. The blanket 30 includes a bedcovering base, such as a blanket shell 31, formed from a suitable textile material by an acceptable manufacturing process such as weaving, an electrical resistance heating means generally indicated at 32, and an overheat protection means as will be described more fully hereinafter. The resistance heating means 32 preferably includes a plurality of lengths of resistance wire disposed within and extending throughout the blanket shell 31, as by being threaded through channels formed therein. By means of a connector plug 34 and suitable conductors enclosed within a sheath 35, the resistance heating means 32 and protection means are connected with a bedside control generally indicated at 36. In turn, the bedside control 36 is connected with a source of electrical current, as at a wall tap, by a connector plug 38. The bedside control 36, as is conventional with an electrically heated blanket, controls the application of electrical current to the resistance heating means 32 in accordance with ambient temperature conditions within the bedside control 36. The particular details of circuitry of the bedside control 36 form no major part of the present invention, and may suitably be one of the circuit configurations generally known and used by manufacturers of electrically heated blankets.

In order to protect the blanket 10 against the continuance of a localized overheated condition, an overheat protection means is provided which includes a plurality of devices, such as those generally indicated at 40 in FIGURE 2, within and disposed throughout the blanket shell 31. Each of the devices 40 is electrically connected in series connection with at least two of the lengths of resistance heating wire which form the electrical resistance heating means 32, and normally conducts electrical current so as to permit energization of the heating means 32 under the control of bedside control 36. Each of the devices 40 includes an element formed of a material which loses physical integrity within a predetermined range of temperature conditions typical of a localized overheated condition of the sort which the blanket 30 must be protected against. The devices 40 are provided in such a number, and are so disposed throughout the shell 31 of the blanket, that at least one of the devices 40 will be affected upon the occurrence of any localized overheated condition, as will be described more fully hereinafter.

As herein applied to elements included in the devices 40, the phrase "loses physical integrity" refers to a substantial failure of the structural and mechanical strength properties and characteristics of a material. Such a loss results from a change in physical state, as from the solid state to a fluid state, or from a change in characteristics while the material continues in the solid state, as a gradual softening and change in crystalline structure. While this invention contemplates the use of various materials which lose physical integrity in various ways under temperature conditions typical of an overheated condition, nonlimiting examples of such materials are those which melt at specific and ascertainable temperatures and those which undergo a change in structure which substantially decreases shear or tensile strength.

Upon the occurrence of a localized overheated condition, the element of an affected one of the devices 40 loses physical integrity, and the corresponding device 40 becomes electrically nonconductive. As the device 40 becomes electrically nonconductive, and as the device is in series connection with the electrical resistance heating means 32, further energization of the heating means 32 is precluded and the blanket 30 is thus protected against the continuance of the overheated condition.

It is contemplated by the present invention that the devices 40 may take a selected one of a number of possible configurations (shown in greater detail in FIGURES 3 through 21). As described to this point, the construction and operation of the blanket 30 encompasses all of the specific configurations for the devices 40 which are now to be described in greater detail.

In a first form for the devices 40 included in the overheat protection means, which form is more particularly indicated at 40A (FIGURES 3, 5 and 6), a temperature response element 51 is shaped into wire form, and is formed of an electrically conductive material. At opposite ends of a short length of the wire-form material forming the element 51, crimpable terminals 52 and 53 are attached, so as to provide for securing together the respective end of the length of material and at least one of the lengths of resistance wire which together define the electrical resistance heating means 32. In order to assure that the danger of electrical shock is minimized even though the blanket 30 may be wetted, the element 51 and the crimping terminals 52, 53, together with the junctures thereof with the resistance heating wires, are enclosed within a suitable sheath 55, which preferably is a sleeve of heat-sealable relative heavy-gauge plastic tubing.

Where the material chosen for use as the temperature responsive element in each of the devices 40 of the overheat protection means may not readily be formed into a wire configuration, another form of device may be selected for use in the overheat protection means. This alternative device, which is more particularly indicated as 40B (FIGURES 4, 7, 8 and 9), uses an element 61 shaped into flat strip form.

Crimpable connectors 62 and 63 are secured to opposite extremities of the flat strip length 61 and to an insulating and supporting member 65 which is contiguous with at least part of the flat strip element 61 so as to support the same. In order to provide a volume for receiving the material forming the element 61, when the same loses physical integrity as contemplated by this invention upon the occurrence of a localized overheated condition which affects the device 40B, the insulating support member 65 is provided with an opening 66 therein adjacent the central portion of the element 61. In common with the device 40A of FIGURE 3, the device 40B of FIGURE 4 includes a heat-sealable plastic tubing member 68 which encloses the element 61, the insulating support member 65, and the junctures of the terminals 62 and 63 with the extremities of at least two lengths of the resistance heating wire which forms the electrical heating means 32.

In the devices 40A and 40B discussed immediately hereinbefore, the elements 51 and 61 preferably are produced by forming an eutectic metal alloy into wire or strip form. The conductivity characteristics of the eutectic metal alloy and the dimensions of the elements 51 and 61 are such that the respective devices 40A and 40B readily conduct electrical currents of the magnitude involved when the electrical heating means 32 is energized, and the resistance of the elements 51 and 61 is not so high as to result in significant self-generation of heat upon such current flow therethrough. Instead, each of the devices 40A and 40B is in heat transfer relation with the electrical resistance heat generating means 32, so as to be affected by the generation of heat therein.

It is a characteristics of an eutectic metal alloy to lose physical integrity, and undergo a change of state from the solid state to the liquid state, within a relatively narrow and predictable range of temperatures and substantially without transitional softening. Such alloys may be formulated, and are commercially available, to have transition points at desired temperatures. In the application here intended, it is preferred that an eutectic metal alloy chosen for the elements 51 and 61 lose its physical integrity and accordingly interrupt the electrical connection provided thereby within a range of temperatures of from 150° to 250° F. A preferred alloy has a melting point of 203° F., at which temperature an element formed of this alloy melts so as to interrupt the electrical interconnection provided thereby and thus preclude further flow of current through the heating means 32.

Additional forms for the devices 40 included in the overheat protection means are contemplated by this invention and are more particularly indicated as device 40C (FIGURES 10, 12, 13 and 14); device 40D (FIGURES 11, 15, 16 and 17); device 40E (FIGURES 18, 19 and 20); and device 40F (FIGURE 21). These further devices 40C, 40D, 40E and 40F differ from the devices 40A and 40B described heretofore in that reliance is placed on the cooperation of certain structure with the loss of physical integrity of the elements included therein in obtaining interruption of the conduction of electricity. More particularly, each of these devices employs an elongate flexing contact member, as will be identified more particularly hereinafter, which is inherently biased toward a position out of electrical contact with an associated stationary contact and yet is releasably secured in electrically conductive relationship with the cooperating stationary contact by the temperature responsive element included in the respective device. This basic similarity between the various devices 40C, 40D, 40E and 40F will be noted in the following discussion, in which the general construction of the devices will first be described with reference to one form and the individual distinctions between the various forms will thereafter be more particularly pointed out.

A preliminary and more complete discussion will be given with reference to the third form for the device 40, more particularly identified as the device 40C (FIGURES 10, 12, 13 and 14). In the device 40C, the element 71 loses physical integrity upon being subjected to a temperature condition typical of an overheated condition, and is a body of a suitable material interposed between a stationary contact member 72, which is formed integrally with one crimpable terminal, and an elongate flexing contact member 75. The elongate flexing contact member 75 preferably is secured in electrical contact with the other crimpable terminal 73 of the device 40C, and both of the terminals 72, 73 and the contact member 75 are fixed to a supporting member 76 of insulating material such as fiberboard. The flexing contact member 75 preferably is formed of a springy strip material, such as spring steel, and is configured so as to be inherently biased toward a position out of electrical contact with the associated stationary contact member 72 (as indicated by phantom lines in FIGURE 13). The element 71 serves to restrain the flexing contact element 75 in a position wherein the same is in electrically conducting relationship with the stationary contact member 72, so that electrical current may flow through the device 40C. The crimpable terminals 72 and 73 are each secured to at least one of the lengths of resistance wire making up the electrical resistance heating means 32, and the various elements are enclosed within a protective sleeve 77, similar to the sleeves provided for the devices 40A and 40B described above.

In the device 40C, the element 71 which serves to restrain the flexing contact 75 in a position wherein the contact is in electrically conductive relationship with the stationary contact 72, may be any suitable material which loses its physical integrity as described before. However, it is preferred to use an eutectic metal alloy solder which secures contact members 72 and 75 in electrical engagement. Where such an eutectic solder is used, the device 40C operates in response to the occurrence of a localized overheated condition which affects the respective device by becoming electrically nonconductive in that the flexing contact 75 is released to move to its position out of electrical engagement with the stationary contact 72 (from the solid line position of FIGURE 13 to the phantom line position of FIGURE 13).

In another form of the device, namely form 40D (FIGURES 11, 15, 16 and 17), an insulating support member 86, somewhat similar to the insulating support member 76 of the device 40C, is provided with a contact receiving recess 88 (FIGURES 16 and 17). The elongate flexing contact member 85 of the device 40D is normally and inherently biased toward a position wherein the member is located within the contact receiving recess 88 (as indicated by phantom lines in FIGURE 16), but is held in electrical engagement with a stationary contact member 82 by an element 81 which loses physical integrity when subjected to a temperature typical of an overheated condition. It may be seen that the device 40D is substantially similar to the device 40C described in more detail above, with the distinction between the two forms of devices lying principally in the provision of an insulating support member 86 of sufficient thickness to include the contact receiving recess 88. This is done, and the flexing contact member 85 is so biased as to be urged toward a position within the recess 88, so as to prevent accidental closure of the switch provided by the device 40D subsequent to separation of the flexing contact 85 from the stationary contact 82, as could occur where suitable pressure is accidentially applied to the device 40C.

While the elements 71 and 81 of the devices 40C and 40D, which lose physical integrity when subjected to a temperature typical of an overheated condition, preferably are solders of eutectic metal alloys, this invention comprehends that additional forms for the device 40, more specifically indicated as devices 40E and 40F (FIGURES 18, 19 and 20 and FIGURE 21, respectively), may be provided wherein the elements which lose physical integrity may be other than an eutectic metal alloy. More particularly, in the device 40E (FIGURES 18, 19 and 20) an elongate flexing contact member 95 is held in electrical contact engagement with the stationary contact 92 by an element 91 which takes the form of a thin strip, ribbon or tape substantially encircling the respective extremities of the contact members and securing the same in electrical contact. The element 91 may be a ribbon of eutectic metal alloy, a thin ribbon of some other metallic material, or a strip of electrically nonconductive material such as a plastic. The element 91 is originally configured substantially in a narrow C-shape, and is inserted through the contact receiving recess 98 of the device 40E so that the legs of the strip may be crimped about the secured-together contact members 92, 95. A modified form, more specifically identified as the device 40F (FIGURE 21), is illustrated to point out that an element 101 similar to the element 91 of the device 40E may be configured as a narrow tall U-shape, and the insulating support member 106 may be partially cut away to provide for access to the contact members from the side. While a variety of forms have been illustrated and described for the devices 40 of the overheat protection means in accordance with this invention, it should be pointed out that this invention contemplates that all of the devices 40 included in the overheat protection means shall be one or another of the specific forms described in greater detail, or a substantial analog thereto. More particularly, the overheat protection means preferably consists of a plurality of devices similar to the devices 40A, 40B, 40C, 40D, 40E and 40F, to the exclusion of bimetallic thermostatic switches such as are conventionally used in electrically heated bedcoverings. The exclusion of bimetallic thermostatic switches from the construction preferred by this invention will provide the full effect of the particular economic advantages inherent in this invention, by permitting the greatest saving possible through the use of devices as have been herein described to be realized in the manufacture of a bedcovering.

In the drawings and specification, there have been set forth preferred embodiments of the invention, and although specific terms are employed, they are used in a generic and descriptive sense only and not for purposes of limitaiton, the scope of the invention being defined in the claims.

I claim:
1. An electrically heated bedcovering, such as a blanket, protected against the continuance of a localized overheated condition comprising:
   a textile blanket shell,
   electrical resistance heating means in said shell so arranged for generating heat throughout the blanket upon flow of electrical current therethrough,
   overheat protection means for interrupting current flow in said heating means upon the occurrence of a localized overheated condition and consisting of a plurality of devices within and disposed throughout said shell and electrically connected in series with said heating means, said plurality of devices being such in number and so arranged throughout the blanket as to provide localized protection throughout the entire blanket, each of said devices normally conducting electrical current therethrough and being thermally coupled to said heating means and including an element which loses physical integrity within a predetermined range of temperatures typical of an overheated condition, and each of said devices becoming electrically nonconductive upon such loss of physical integrity by said element so as to permanently interrupt and preclude further flow of current in said heating means, each of said devices including a protective plastic sleeve within which said elements are enclosed, and
   control means positioned externally of said blanket shell and adapted to be connected to a source of electrical current and electrically connected to said heating means and said protection means for controlling the flow of electrical current thereto in response to variations in ambient temperature within said control means.

2. A bedcovering according to claim 1, wherein said heating means comprises a plurality of lengths of resistance wire, each of said elements included in said devices comprises a length of electrically conductive material joined at opposite extremities with at least two of said lengths of resistance wire so as to be in series connection therewith, and said protective sleeve enclosing said length of conductive material and the junctures thereof with said lengths of resistance wire.

3. A bedcovering according to claim 2 wherein said material comprising said element is in wire form and each of said devices further comprises a pair of crimped terminals securing together respective extremities of said lengths of material and of resistance wire.

4. A bedcovering according to claim 2 wherein said material comprising said element is in flat strip form and each of said devices further comprises an electrically insulating support member within said protective sleeve and contiguous with said flat strip length of material, and a pair of terminals mounted on said support member for securing together respective extremities of said lengths of material and of resistance wire.

5. A bedcovering according to claim 1 wherein said heating means comprises a plurality of lengths of resistance wire and each of said devices comprises an electrically insulating support member, a stationary contact mounted on said support member and joined to at least one of said lengths of resistance wire, an elongate flexing contact mounted on said support member and being inherently biased toward a position out of electrical contact with said stationary contact and joined to at least one other of said lengths of resistance wire, a body of material defining said element and releasably securing said flexing contact in a position in electrical contact with said stationary contact, and said protective sleeve enclosing said support member, said body, said contacts and the junctures of said contacts with said lengths of resistance wire.

6. A bedcovering according to claim 5 wherein said support member includes a contact receiving recess and the position toward which said flexing contact is inherently biased is such that said flexing contact upon release enters into said recess.

7. A bedcovering according to claim 1 wherein said element is of an eutectic metal alloy.

8. A bedcovering according to claim 7 wherein the range of temperature within which said alloy loses physical integrity is from 150° to 250° F.

9. A bedcovering according to claim 8 wherein said alloy loses physical integrity at approximately 203° F.

References Cited

UNITED STATES PATENTS

| | | | |
|---|---|---|---|
| 530,430 | 12/1894 | Klein | 200—142 |
| 2,282,849 | 5/1942 | Beyer | 200—113 |
| 2,403,803 | 7/1946 | Kearsley | 219—212 |
| 2,516,584 | 7/1950 | Parr | 200—138 |
| 2,658,125 | 11/1953 | Whitfield | 200—113 |
| 2,727,116 | 12/1955 | Alfred et al. | 200—168 |
| 2,790,049 | 4/1957 | McAlister | 200—142 |
| 2,875,298 | 2/1959 | Tracy | 200—142 |
| 3,119,926 | 1/1964 | Mills et al. | 219—212 |
| 3,356,825 | 12/1967 | Mills et al. | 219—212 |

GEORGE HARRIS, *Primary Examiner.*

V. Y. MAZEWSKY, *Assistant Examiner.*

U.S. Cl. X.R.

200—142, 135; 219—529, 517